US011063999B2

(12) United States Patent
Bomfim et al.

(10) Patent No.: US 11,063,999 B2
(45) Date of Patent: *Jul. 13, 2021

(54) DISTRIBUTED FRAGMENT TIMESTAMP SYNCHRONIZATION

(71) Applicant: Microsoft Technology Licensing, LLC, Redmond, WA (US)

(72) Inventors: Rodrigo Maialle Bomfim, Sammamish, WA (US); Prakash Duggaraju, Redmond, WA (US); Anton Kucer, Redmond, WA (US); Thomas Marquardt, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/517,389

(22) Filed: Jul. 19, 2019

(65) Prior Publication Data

US 2019/0342360 A1 Nov. 7, 2019

Related U.S. Application Data

(63) Continuation of application No. 13/802,767, filed on Mar. 14, 2013, now Pat. No. 10,382,512.

(51) Int. Cl.
*H04L 29/06* (2006.01)
*H04N 21/237* (2011.01)
*H04N 21/236* (2011.01)
*H04N 21/643* (2011.01)
*H04N 21/845* (2011.01)

(52) U.S. Cl.
CPC ............ *H04L 65/602* (2013.01); *H04L 65/80* (2013.01); *H04N 21/237* (2013.01); *H04N 21/23608* (2013.01); *H04N 21/64322* (2013.01); *H04N 21/8456* (2013.01)

(58) Field of Classification Search
CPC . H04L 65/602; H04L 65/80; H04N 21/64322; H04N 21/8456; H04N 21/23608; H04N 21/237
See application file for complete search history.

(56) References Cited

U.S. PATENT DOCUMENTS

| 5,801,781 | A | * | 9/1998 | Hiroshima | ....... H04N 21/23608 |
| | | | | | 348/441 |
| 6,557,112 | B1 | * | 4/2003 | Shimada | ............. H04L 43/0847 |
| | | | | | 370/222 |
| 2002/0001348 | A1 | * | 1/2002 | Yiwen | .................. H04N 5/4401 |
| | | | | | 375/240.26 |
| 2003/0067921 | A1 | * | 4/2003 | Sivalingham | ......... H04W 12/06 |
| | | | | | 370/394 |

(Continued)

Primary Examiner — Nnenna N Ekpo
(74) Attorney, Agent, or Firm — Davin Chin; Chin IP, PLLC

(57) ABSTRACT

A fault tolerant video streaming distribution service utilizes multiple distribution servers to receive and process a video stream simultaneously. Each distribution server performs a mapping of each encoded timestamp associated with a transport stream having time discontinuities to a continuous time sequence. The distribution servers coordinate the timestamp mapping through a distributed leader election protocol that elects a leader to coordinate the timestamp mapping in an environment where failures are anticipated and the number of distribution servers dynamically changes without notice.

20 Claims, 9 Drawing Sheets

(56) References Cited

U.S. PATENT DOCUMENTS

| | | | |
|---|---|---|---|
| 2003/0079230 A1* | 4/2003 | Woodward, Jr. | H04N 7/17336 725/90 |
| 2005/0254526 A1* | 11/2005 | Wang | H04L 65/608 370/503 |
| 2012/0327831 A1* | 12/2012 | Arendas | H04W 52/0216 370/311 |
| 2013/0044803 A1* | 2/2013 | Fisher | H04N 21/8455 375/240.02 |
| 2014/0068076 A1* | 3/2014 | Dasher | H04L 65/4076 709/226 |
| 2014/0153909 A1* | 6/2014 | MacInnis | H04N 9/7921 386/353 |
| 2014/0207971 A1* | 7/2014 | Lecourtier | H04L 7/0079 709/248 |

\* cited by examiner

DISTRIBUTED FRAGMENT TIMESTAMP SYNCHRONIZATION

CROSS-REFERENCE TO RELATED APPLICATION(S)

This application is a continuation of U.S. patent application Ser. No. 13/802,767, filed Mar. 14, 2013, entitled "DISTRIBUTED FRAGMENT TIMESTAMP SYNCHRONIZATION". The entirety of this afore-mentioned application is incorporated herein by reference.

BACKGROUND

Advances in the production of digital media have increased the consumers' demand for rich and varied media viewing experiences. The transmission of digital media is often streamed over various types of network connections to a variety of electronic devices. The digital media may be offered in different video quality levels, such as high-definition video, standard definition video, or low resolution video. The digital media may be streamed through a network connection using a stateful transport protocol, such as real-time transport protocol (RTP), or through a network connection using a stateless protocol such as hypertext transfer protocol (HTTP). The digital media may be streamed to a variety of electronic devices such as mobile devices, computers, digital set top boxes, and digital televisions, each of which have different bandwidth and resource capacity for receiving the digital media. However, such a rich and varied media viewing experience brings with it the expectation that the digital media is available regardless of any failures in the networks and devices that are used to stream the digital media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A fault tolerant media distribution service processes a video stream encoded and packaged in accordance with a first transport protocol into a second transport protocol for distribution to customers. The first transport protocol contains packets of video and audio frames with timestamps relative to a time reference that is subject to discontinuities. The fault tolerant media distribution service maps the timestamps in the incoming video stream into the same continuous time sequence in real time for each copy of a corresponding output video stream.

The distribution service includes multiple distribution servers with each distribution server receiving a same video stream independently and concurrently. The configuration of the distribution servers to process a same video stream concurrently avoids a single point of failure. The distribution servers coordinate the timestamp mapping process through a distributed leader election protocol. A leader from the group of distribution servers is elected to coordinate the timestamp mapping synchronization where failures to a distribution server is anticipated and the number of distribution servers participating in the distribution service dynamically changes without notice to other distribution servers.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
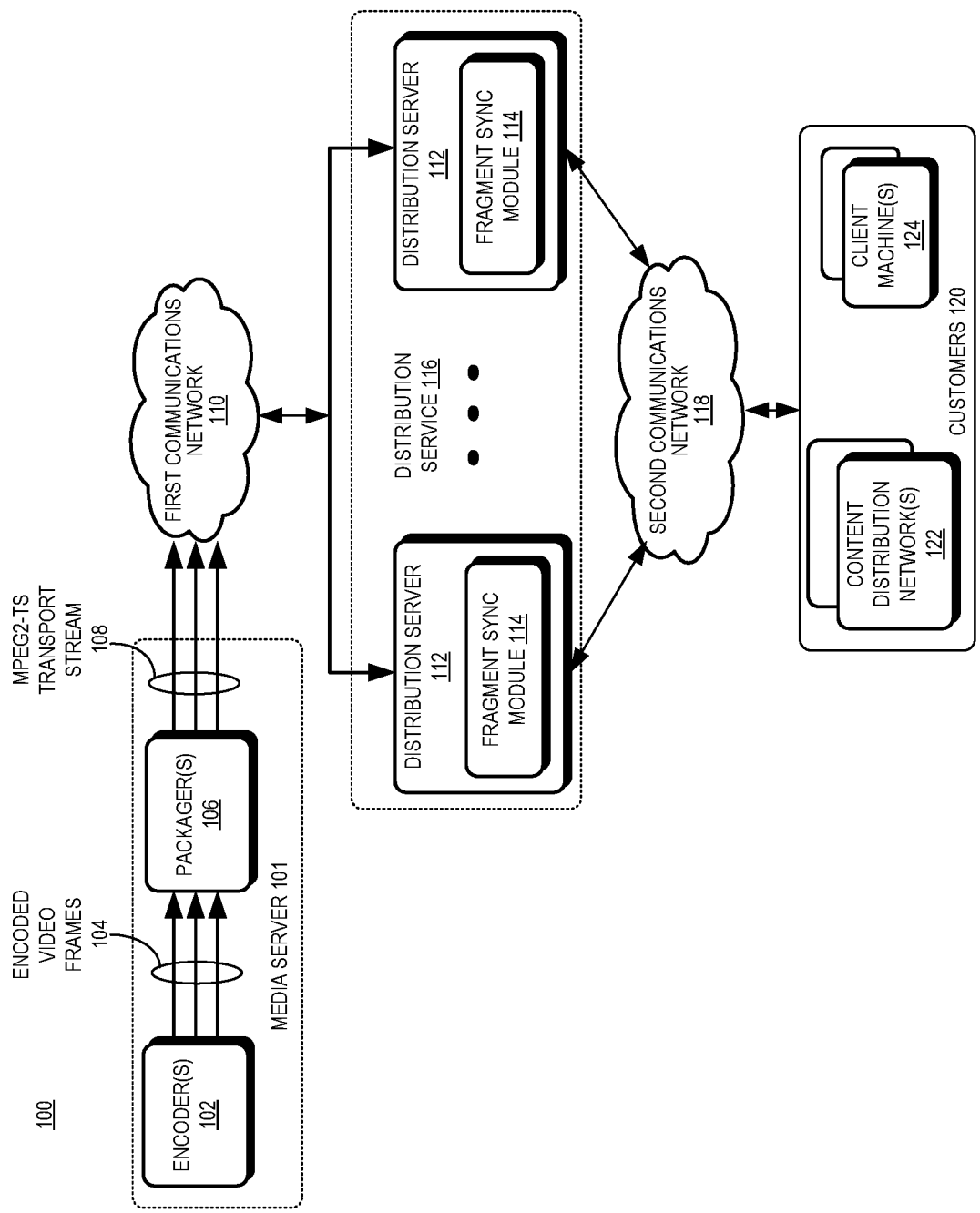
FIG. 1 is a block diagram illustrating an exemplary system utilizing distributed fragment timestamp synchronization.

Various embodiments described herein pertain to a fault tolerant video streaming distribution service. The distribution service utilizes multiple distribution servers to receive and process the same video stream simultaneously to multiple users. The source video stream (i.e., audio/visual) may come from a satellite feed, an encoder/packager, broadcast network, or from other sources of live video. The distribution service may utilize adaptive HTTP streaming to deliver the video stream to customers, such as client machines or content distribution networks (CDN). In order to ensure that the distribution service is fault tolerant, each distribution server is configured to receive and process a video stream simultaneously so that there is not a single point of failure in the streaming process.

The distribution service receives a source video stream that may be a file or a live stream that is compressed, encrypted, and formatted into packets. The packets are then decrypted and decompressed and reformatted into fragments. Each fragment is independent of the previous and succeeding fragments. The fragments are hosted on a distribution server that enables a customer (e.g., user, content delivery network, distributer, etc.) to download the fragments via an adaptive HTTP streaming protocol.

A video stream may be composed of multiple sequences of the video content where each sequence differs in bitrate, resolution, and/or codec level. The video stream is transmitted as packets that are reassembled at each distribution server. The timestamps are used to synchronize the frames in the transport stream so that an audio track is played back with its matching video frame. The timestamps indicate the exact moment when a video frame or an audio frame has to be presented to the user. Timestamps are also used for players to index content within the video timeline, enabling features such as a seek-bar which enables the user to choose the playback starting point.

The timestamps embedded in the packets are placed by the encoder in accordance with a transport protocol. In one or more embodiments, the transport protocol is the MPEG2 transport stream which is defined in the International Telecommunication Union (ITU) H.222 and H.262 standards. The encoder generates timestamps that do not represent a continuous time sequence. This is due to the rollover of the 33-bit counter used to generate a timestamp. The encoder in the MPEG2 transport stream uses a 27 MHz system clock to drive the encoding process. The timestamps are based on a counter driven by a 90 kHz clock (e.g., 27 MHz/300=90 kHz) that generates a 33-bit timestamp. This causes the values of the timestamps to roll over or reset every 27 hours thereby creating a discontinuity in the timestamp of a video stream. In addition, a discontinuity may also occur when an encoder fails or is interrupted, thereby causing the counter is reset.

In one or more embodiments, the second transport protocol may be Microsoft's Smooth Streaming protocol which uses global and continuous timestamps. Smooth Streaming uses a 64-bit timestamp which rolls over approximately every 58,000 years. Smooth Streaming is an adaptive HTTP streaming protocol that distributes the video stream in fragments to customers. The distribution servers repackage the video stream from the packet format used by the MPEG2 TS protocol into fragments supported by the Smooth Streaming protocol for download to the customers. Each distribution server performs a mapping of a timestamp associated with the MPEG2 TS packets into a continuous time sequence used for the fragments. The mapping is performed by each distribution server, even though it is redundant, so that there is not a single point of failure.

The distribution servers coordinate the timestamp mapping process through a distributed leader election protocol. Leader election arbitrarily elects a distributed server to coordinate the timestamp mapping synchronization where failures to the distributed servers are anticipated and the number of distributed servers participating in the distribution service dynamically changes without notice to other distributed servers.

The timestamp mapping is performed in real time, while the video stream is streamed from the source to the customers via the Smooth Streaming protocol. In this manner, the Smooth Streaming protocol can compensate for fluctuations in user bandwidth, and CPU capacity in real time by adjusting the quality of the video stream distributed to a customer according to the capacity of the customer's computing resources. A customer having a lower bandwidth that cannot support the bitrate of a video stream at a higher bitrate would receive a lower bitrate video stream. A customer having a higher bandwidth than the bit rate of a segment may receive the video stream in at a higher bitrate. In one or more embodiments, the adaptive HTTP streaming may be the Microsoft® Smooth Streaming protocol.

Attention now turns to a discussion of a system in which embodiments may be implemented. FIG. 1 illustrates a system 100 that may include a media server 101, a first communications network 110, a distribution service 116, customers 120 of the distribution service, and a second communications network 118. The media server 101 may include one or more encoders 102 and one or more packagers 106. The distribution service 116 may include one or more distribution servers 112. The customers 120 of the distribution service 116 may include one or more content distribution networks (CDN) 122 and one or more client machines 124. Although the system 100 as shown in FIG. 1 has a limited number of elements in a certain topology, it may be appreciated that the system 100 may include more or less elements in alternate topologies as desired for a given implementation.

The media server 101 may include one or more encoders 102 and one or more packagers 106. An encoder 102 codifies the source data representing the digital video content and prepares it in a format for delivery in accordance with a specific technical standard and/or protocol. The source data may be a file (e.g., MPEG2 file) or a live stream, such as a satellite or a broadcast feed. The source data is the raw uncompressed video/audio data.

The source data may be configured as a series of frames having images produced at a frame rate. The higher the resolution and the frame rate, the higher the bitrate that is needed for transmission of the digital video. The bitrate is the rate at which bits are transmitted in a given period of time. The bitrate is also used to represent the quality of a video stream.

An encoder 102 compresses the source data into a compressed format in order to reduce the bandwidth needed to transmit the digital video. A decoder decompresses the compressed data upon receiving it so that it can be played back. A codec is a device or software application that can both compress and decompress a digital video file. There are various codec standards that define a particular compression format, such as without limitation, MPEG-1, MPEG-2, MPEG-4, H.264, VC-1, and so forth. The choice of codec may depend on a number of factors, such as the quality requirements for the video, the bitrate, the available bandwidth, and so forth. In one or more embodiments, an encoder 102 may include an MPEG-4 encoder and/or MPEG-2 encoder. The encoders 102 may generate several compressed digital files, each encoded in accordance with a different set of parameters, such as bitrates.

A packager 106 or container encapsulates a number of compressed video frames into a transport packet in accordance with a specified transport protocol for transmission across a communication network. There are various packaging standards and each indicates the specifications and format of the transport protocol. Examples of such transport protocols include MPEG 2 Transport Stream (TS), Real Transport Protocol (RTP), and so forth. In one or more embodiments, the packager 106 generates packets in accordance with the MPEG2 TS format that are transmitted through the communication network to multiple distribution servers concurrently.

In one or more embodiments, the encoder 102 and packager 106 may be components of a single media server 101. In other embodiments, each encoder 102 may be hosted on one or more servers that are different from the server hosting the packager 106. There may be different types of encoders 102 hosted on the same or different servers. There may be multiple servers where each server hosts a packager 106. The embodiments are not limited to any particular configuration of the servers hosting the encoders 102 and packagers 106.

The media server 101 may be communicatively coupled to the distribution service 116 through a first communications network 110. The first communication network 110 may be any type of communication medium operating in accordance with a communications protocol. The first communication network 110 may include one or more local area networks, wide area networks, direction connections, virtual connections, private networks, virtual private networks, some combination of the above, and the like. In one or more embodiments, the first communication network 110 may be a private network.

Multicasting is a networking technology that sends information as a packet to a group of destinations simultaneously over a communications network at once. The nodes in the network replicate the packet to reach the multiple destinations as needed when downstream receivers are reached over multiple links. A multicast group is a set of nodes that elect to receive information or packets sent to each node in the group. A multicast address is used by a source node to send packets to each of the receiver nodes associated with the multicast group and by the receiver nodes to receive the packets.

The distribution servers 112 that make up the distribution service 116 may be configured as a multicast group. The media server 101 may generate a message which is disseminated to the distribution service 116 through a number of links, routers, and networks. Each node in the first communications network 110 that receives the message replicates the message and forwards it to the next node in a path to an intended distribution server 112.

The distribution servers 112 in the multicast group may be located in the same physical location, such as the same data center. The number of distribution servers 112 that form the multicast group may vary over time and the multicast group may be dynamically configurable in real time. Additional distribution servers 112 may join the multicast group while other distribution servers 112 may leave the multicast group. The dynamic configuration of the multicast group is beneficial for scalability and also for fault tolerance. In the event of a failure to a distribution server 112, another distribution server 112 may be added to the multicast group to replace the failed distribution server.

The distribution servers 112 receive the packets that form the video stream and process them into a second format used to deliver the video stream to an intended customer. The second format may be the Microsoft® Smooth Streaming protocol. Smooth Streaming uses fragments formatted in accordance with the fragmented MP4 format (fMP4) based on Part 12 of the MPEG-4 standard which defines ISO Base Media File Format. The fragmented MP4 format is also referred to as Protected Interoperable File Format (PIFF). However, the technology described herein is not limited to Smooth Streaming or fMP4 and may be easily applied to other transfer protocol relying on a continuous time sequence.

Each distribution server 112 may contain a fragment sync module 114 that maps the timestamp of the incoming packets into an absolute timestamp that is uniform across each of the distribution servers. The fragment sync module 114 of each distribution server 112 performs the timestamp mapping in order to ensure that there is not a single point of failure in the distribution service 116. By contrast, if a single distribution server were to perform the timestamp mapping and fail, there may be an interruption in streaming the video to a customer. By having each distribution server 112 perform the mapping, there is no single point of failure that can cripple the distribution service 116.

In one or more embodiments, the fragment sync module 114 may be a sequence of computer program instructions, that when executed by a processor, causes the processor to perform methods and/or operations in accordance with a prescribed task. The fragment sync module 114 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The distribution servers 112 are communicatively coupled to the customers 120 through a second communications network 118. The customers 120 may include one or more content distribution networks 122 and/or one or more client machines 124. The content distribution networks 122 may distribute the video streams to other users. The client machines 124 may be used to distribute the video streams directly to end users.

The second communications network 118 may be any type of communication medium operating in accordance with a communications protocol. The second communications network 118 may include one or more local area networks, wide area networks, direction connections, virtual connections, private networks, virtual private networks, some combination of the above, and the like. In one or more embodiments, the second communications network 118 may be the Internet.

The distribution servers 112 communicate with the customers 120 by exchanging messages within a session through a stateless messaging protocol. A session is a sequence of messages that are exchanged between two devices. In a stateless messaging protocol, the servers communicate without saving any state information, such as protocol parameters, user or client machine identifiers, session identifiers, authentication status, and the like. The hypertext transfer protocol (HTTP) is a stateless messaging protocol. In HTTP, each request and response is treated as an independent communication that does not rely on information from a previous communication.

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, a tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

The distribution servers, media server, and client machines may include, but are not limited to, a mobile device, a personal digital assistant, a mobile computing device, a smart phone, a cellular telephone, a handheld computer, a server, a server array or server farm, a web server, a network server, an Internet server, a tablet, a work station, a mini-computer, a mainframe computer, a supercomputer, a network appliance, a web appliance, a distributed computing system, multiprocessor systems, or combination thereof.

Although the system 100 as shown in FIG. 1 has a limited number of elements in a certain configuration, it may be appreciated that the system 100 may include more or less elements in alternate configurations as desired for a given implementation. The embodiments are not limited in this manner.

Figure 2:
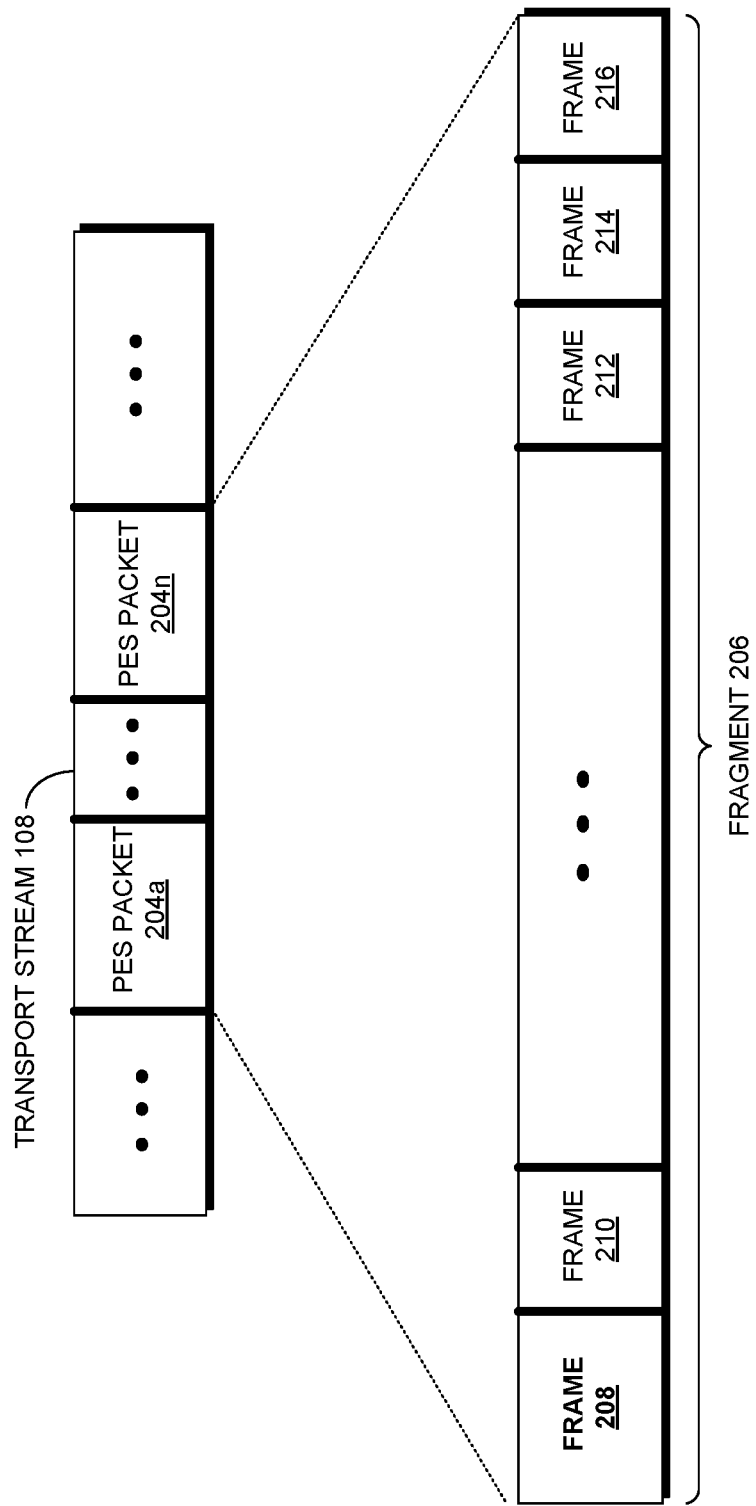
FIG. 2 is a block diagram illustrating an exemplary transport stream.

FIG. 2 illustrates a transport stream 108 packaged as a sequence of fixed-sized packetized elementary stream (PES) packets 204a-204n (collectively, "204"), in accordance with the MPEG2 TS protocol. A transport stream 108 may carry multiple programs. Each PES packet typically includes a single video frame. The header of a PES packet may contain a Decode Time Stamp (DTS) and a Presentation Time Stamp (PTS). The Decode Time Stamp (DTS) indicates to the decoder when to decode a frame. The Presentation Time Stamp (PTS) indicates to the decoder when to display a frame.

As shown in FIG. 2, a transport stream 108 may include multiple PES packets 204. A fragment 206, in terms of the fragmented MP4 standard or Smooth Streaming protocol, is a closed group of pictures (GOP) that is approximately 2 seconds in duration. A fragment 206 may be composed of multiple frames 208-216. The frame rate of the presentation dictates the number of frames per second and the approximate number of frames in a fragment.

Attention now turns to a discussion of the distributed fragmented timestamp synchronization that may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
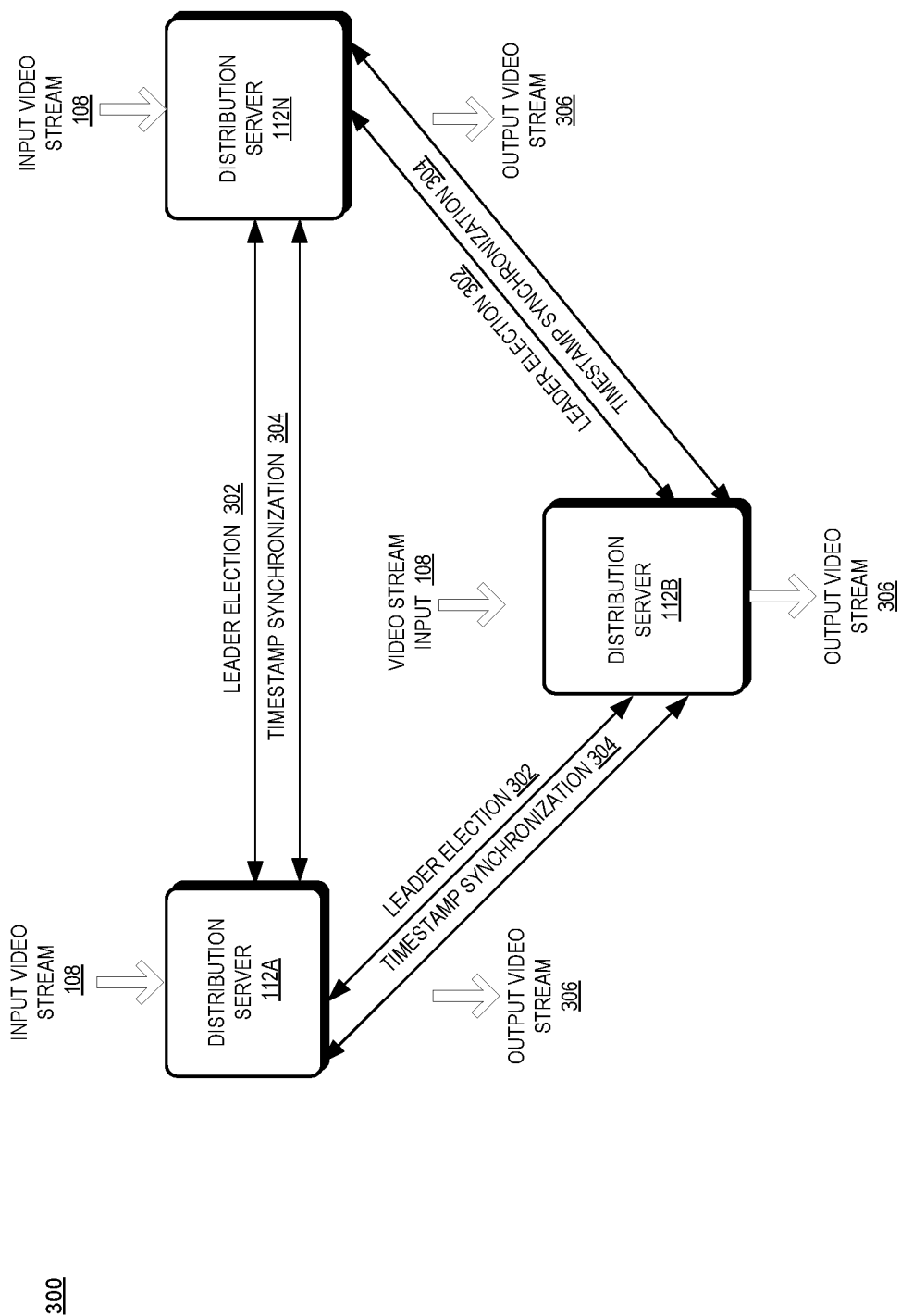
FIG. 3 is a block diagram illustrating an exemplary method for performing fragment timestamp synchronization.

FIG. 3 illustrates an exemplary method 300 used by the fragment sync module 114 to perform the timestamp mapping synchronization. Each distribution server 112A-112N, in real time, maps the same input video stream 108 into the same output video stream 306, in real time, by processing each packet in the input video stream 108 continuously using a leader election process 302 and a timestamp synchronization process 304.

The leader election process 302 is performed as soon as the first server 112 starts and then whenever a server joins the distribution service, or when the leader election process 302 is requested by a distribution server 112 at periodic intervals, or when an error is detected. At the end of each election, the leader has the current count of members in the group, which is then used for accounting for member acknowledgements during the timestamp synchronization process 304. The timestamp synchronization process 304 is performed when the input video stream 108 is received initially, when a leader changes, or when a clock discontinuity is detected. The leader election and timestamp synchronization processes are performed repeatedly during the processing of the input video stream.

Figure 4:
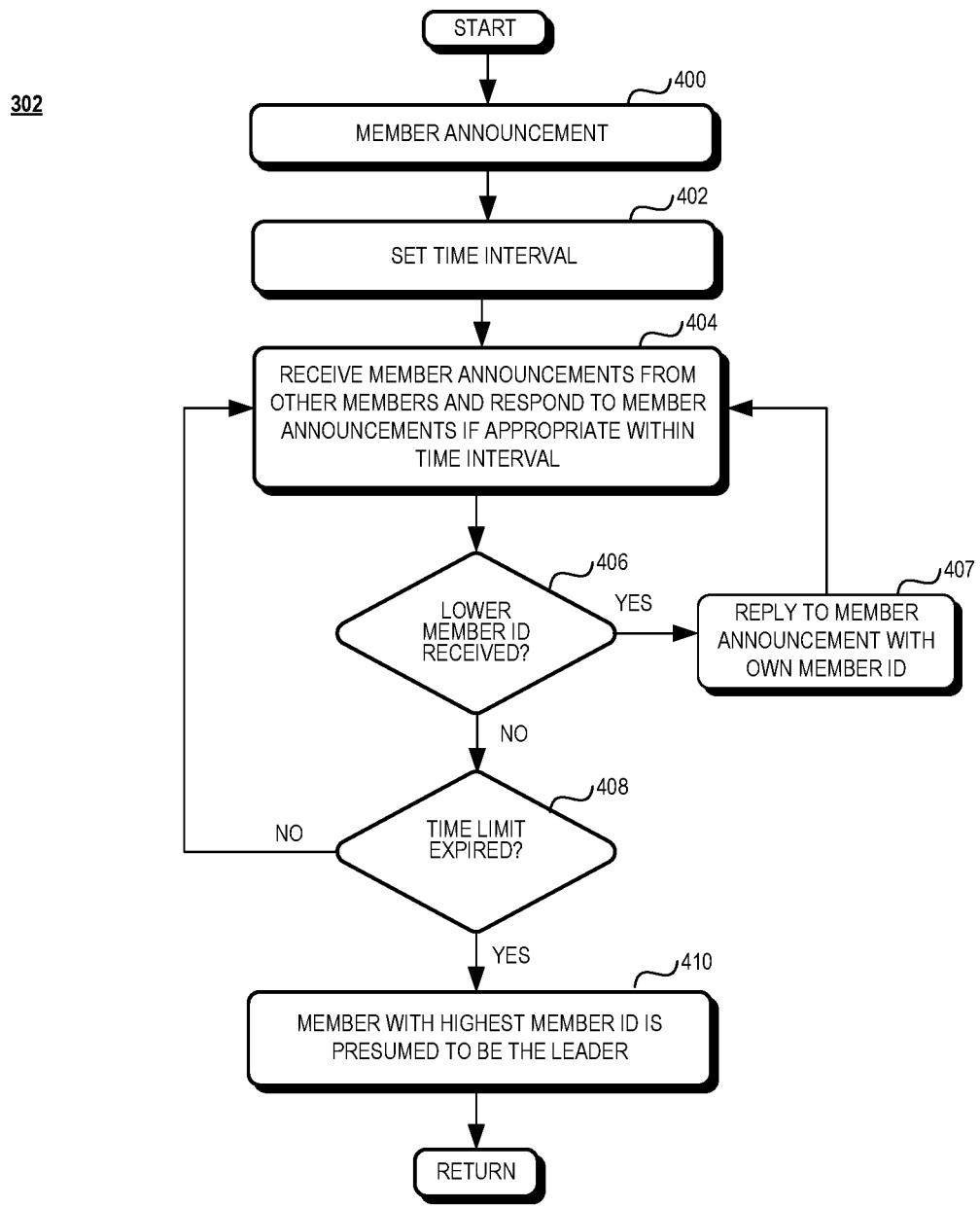
FIG. 4 is a flow diagram illustrating an exemplary method for performing leader election.

FIG. 4 illustrates an exemplary method 302 used by the fragment sync module 114 to perform leader election. Leader election is used to select one of the distribution servers 112 to control the timestamp synchronization in a computing environment where server failures are anticipated. A leader is a member of the distribution service having a member identifier with the highest numeric value. The member identifiers are randomly generated. A leader is elected when an input video stream is received, when a new server joins the distribution service, when the leader election process is requested by a distribution server at periodic intervals, or when an error is detected. Furthermore, each distribution server may process several input video streams concurrently. Each input video stream may be associated with an identifier to distinguish one input video stream from another. As such, a distribution server may be a leader for one input video stream and a non-leader member for another input video stream.

Initially, member announcements are made (block 400). Each distribution server 112 that is a member of the distribution service 116 transmits to other members a message indicating their respective member identifier (block 400). Then, a predetermined time interval is set (block 402). A distribution server 112 may receive member announcements from other distribution servers 112 within the distribution service's multicast group (block 404). The distribution server 112 listens to the member announcements for a member having a higher member identifier than its member identifier within a predetermined time interval. The distribution server 112 does not respond to member announcements from a distribution server 112 having a higher member identifier than its member identifier.

If the distribution server 112 receives a member announcement with a member identifier lower than its own (block 406—yes), then the distribution server 112 may reply to the member announcement with its member identifier (block 407) and continue to receive member announcements (block 404). The distribution server 112 does not respond to member announcements where the member identifier is higher than the distribution server 112 receiving the announcement (block 406—no). A distribution server 112 continues to receive the membership announcements during the time interval expires (block 408—no).

When the time interval expires (block 408—yes), then the distribution server 112 with the highest member identifier is then presumed to the leader (block 410). A distribution server 112 knows that it is the leader when it has not received any member announcements within the time interval thereby safely assuming it has the highest member identifier.

Figure 5:
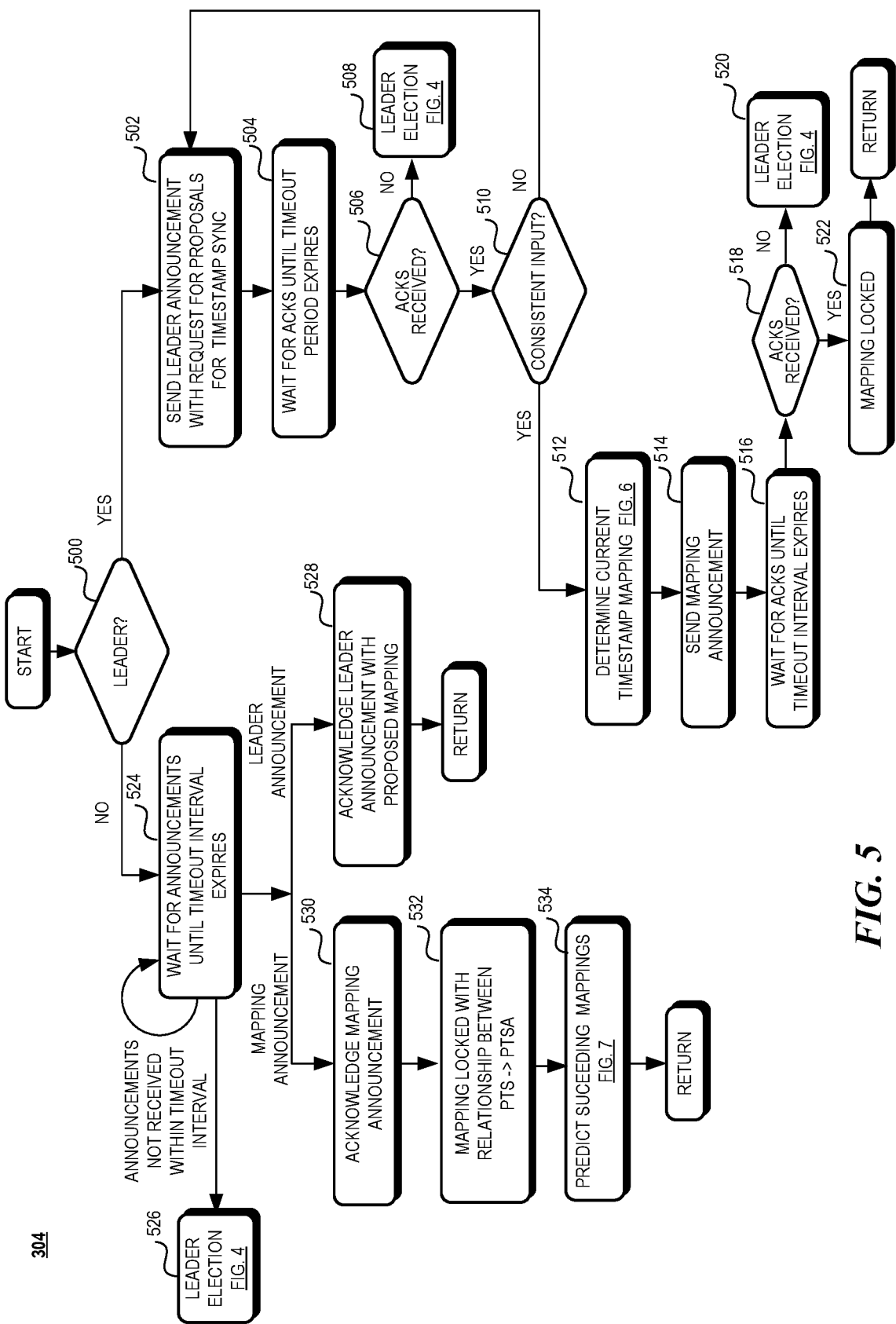
FIG. 5 is a flow diagram illustrating an exemplary method for performing timestamp synchronization.

FIG. 5 illustrates an exemplary method 304 used by the fragment sync module 114 to perform the timestamp mapping synchronization. The leader of the distributed servers controls the timestamp mapping synchronization by performing a current timestamp mapping with respect of a reference time point (e.g., UTC time). Thereafter, the distributed servers continue to perform the subsequent fragment timestamp mappings individually. As long as the timestamps in the transport stream are continuous, there is no need for resynchronization. If any of the distributed servers detect a discontinuity in the incoming transport stream, a new timestamp synchronization mapping session is initiated. A discontinuity in the incoming transport stream is indicative that the mapping could not be performed precisely.

Referring to FIG. 5, a leader (block 500—yes) may broadcast a leader announcement to the other distribution servers 112 in the distribution service to request proposals for the current timestamp mapping for the incoming transport stream (block 502). The leader waits for acknowledgements in response to the leader announcement from the other distribution servers up to a timeout interval (block 504). If acknowledgements are not received from all members after the timeout interval has expired (block 506—no), then leader election is performed again (block 508). When acknowledgements have not been received within the timeout interval, the leader may assume that a network failure or other mishap may have occurred within the distribution service thereby necessitating election of a new leader to control the timestamp synchronization process.

Prior to determining the current timestamp mapping, the leader needs to determine if the incoming transport stream is the same transport stream being streamed to each distribution server in the distribution service. The leader matches a sample of the incoming transport stream from each distribution server to ensure that the mapping is made with respect to the same portion of the incoming stream. This is done by having each distribution server respond to the leader announcement with the member identifier and an array of timestamps for the most recent portion of the incoming stream. If each acknowledgement contains timestamps that overlap within a reasonable degree, then the transport streams are deemed consistent (block 510—yes). For example, if the leader receives an array of timestamps from one member that includes frames 1-6, and another array of timestamps from another member that includes frames 2-5, the transport stream is considered consistent since there is an overlap of frames 2-5 from both distribution servers. If the incoming transport stream is not consistent (block 510—no), then the leader sends out another leader announcement (block 502).

If the incoming transport stream is consistent (block 510—yes), then the leader determines a current timestamp mapping (block 512). The current timestamp mapping is then broadcasted to each of the non-leader distribution servers (block 514). The leader then waits for acknowledgements from each of the non-leader distribution servers until a timeout interval expires (block 516). If the acknowledgements are not received within the timeout interval (block 518—no), then leader election is performed again (block 520). The lack of received acknowledgement indicates a failure in the distribution service. Otherwise, if all the acknowledgements are received (block 518—yes), then the current timestamp mapping is locked (block 522).

Figure 6:
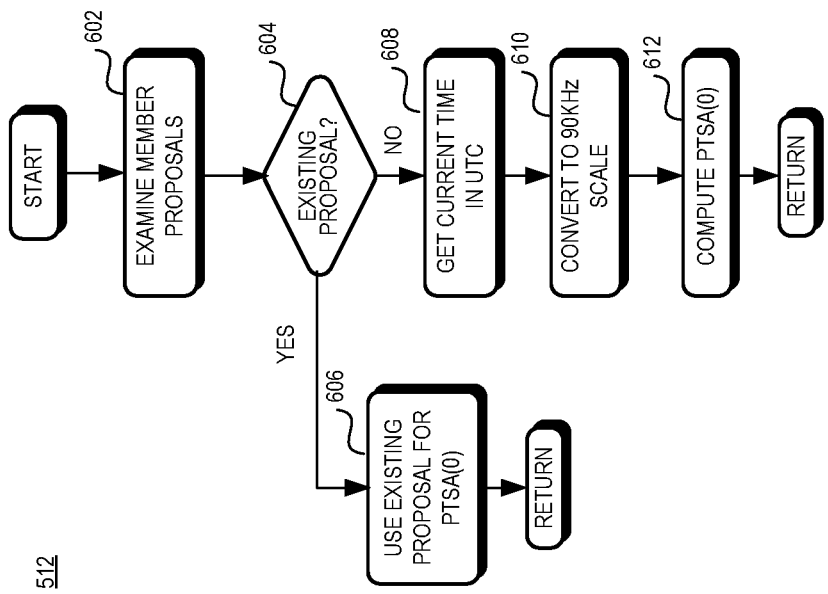
FIG. 6 is a flow diagram illustrating an exemplary method for performing the timestamp mapping.

FIG. 6 illustrates an exemplary method 512 used by the fragment sync module 114 in each distribution server 112 to determine a current timestamp mapping. The fragment sync module 114 in the leader distribution server performs the method shown in FIG. 6. The leader analyzes each of the timestamp proposals received from the leader announcement (block 602). If one of the timestamp proposals is an existing proposal that matches a region of the incoming transport stream (block 604—yes), then the leader uses the existing proposal for the current timestamp mapping, PTSA (0) (block 606). Otherwise, if there are no existing mapping proposals for the incoming stream (block 604—no), then a reference timestamp is generated as the current timestamp mapping.

The fragment sync module 114 generates a current time (block 608) and converts it into the 90 kHz scale (block 610) which is then defined as a reference timestamp, PTSA(0) (block 612). The current time may be a predetermined time point in Universal Time Coordinated (UTC) otherwise referred to as Greenwich Mean Time (block 608). The reference timestamp may be used as the current timestamp mapping, PTSA(0), as follows:

$$PTSA(0) = \frac{\text{Current Time (100 ns)}}{1{,}000} \times 9\text{ kHz}.$$

Referring back to FIG. 5, a non-leader distribution server (block 500—no) waits for leader and mapping announcements within a timeout interval (block 524). If no such announcements are received within the timeout interval, then leader election is performed again (block 526). The lack of received announcements indicates a failure within the distribution service.

When a non-leader receives a leader announcement, the non-leader responds with an acknowledgement that contains a proposed timestamp mapping (block 528). A proposed timestamp mapping may include a previously determined timestamp mapping for the incoming stream or a suggestion based on their own predictive mapping (block 528).

When a non-leader receives a mapping announcement, the non-leader acknowledges receipt of the current mapping (block 530). The current mapping is used to establish a relationship between a PTS timestamp and a corresponding PTSA. For example, the current mapping may indicate that PTS (4) relates to PTSA (400). Once this mapping is determined, then the non-leader and leader distribution servers may predict the succeeding mappings (block 534).

Figure 7:
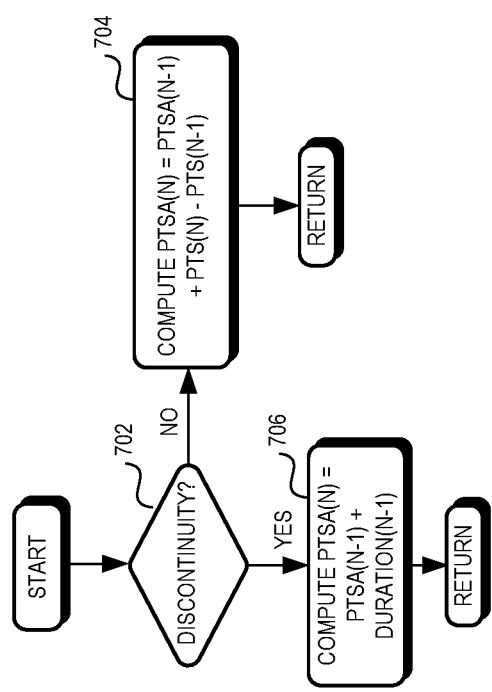
FIG. 7 is a flow diagram illustrating another exemplary method for performing timestamp mappings.

FIG. 7 illustrates an exemplary method 534 used by the fragment sync module 114 in each distribution server to determine the timestamp mapping for the frames that succeed the current timestamp mapping. After the current timestamp mapping is made, each distribution server may continue to map the timestamps of the PES packets that follow without collaboration with the other distribution servers. For each PES packet that succeeds the current PES packet, the fragment sync module 114 in each distribution server 112 may detect whether there is a discontinuity in the timestamps in a received PES packet. A discontinuity may be detected in a continuity flag or continuity counter in the packet. An encoder may flag a rollover by setting a continuity flag in the header of the PES packet to indicate the rollover. Each PES packet contains a continuity counter that may be used to detect packets arriving out of sequence which is indicative of a lost packet which caused the discontinuity.

Referring to FIG. 7, if no discontinuity is detected (block 702—no), then the next PTSA, PTSA(n), may be calculated as: PTSA(n)=PTSA(n−1)+PTS(n)−PTS(n−1), which is the value of the timestamp of the preceding fragment is increased by the difference between the timestamp value of the current packet and the timestamp value of the preceding packet. Otherwise, if a discontinuity is detected (block 702—yes), then the next PTSA, PTSA(n), may be calculated as, PTSA(n)=PTSA(n−1)+Duration (n−1), where Duration (n−1) is the time duration of the frames received since PTSA (n−1).

Figure 8:
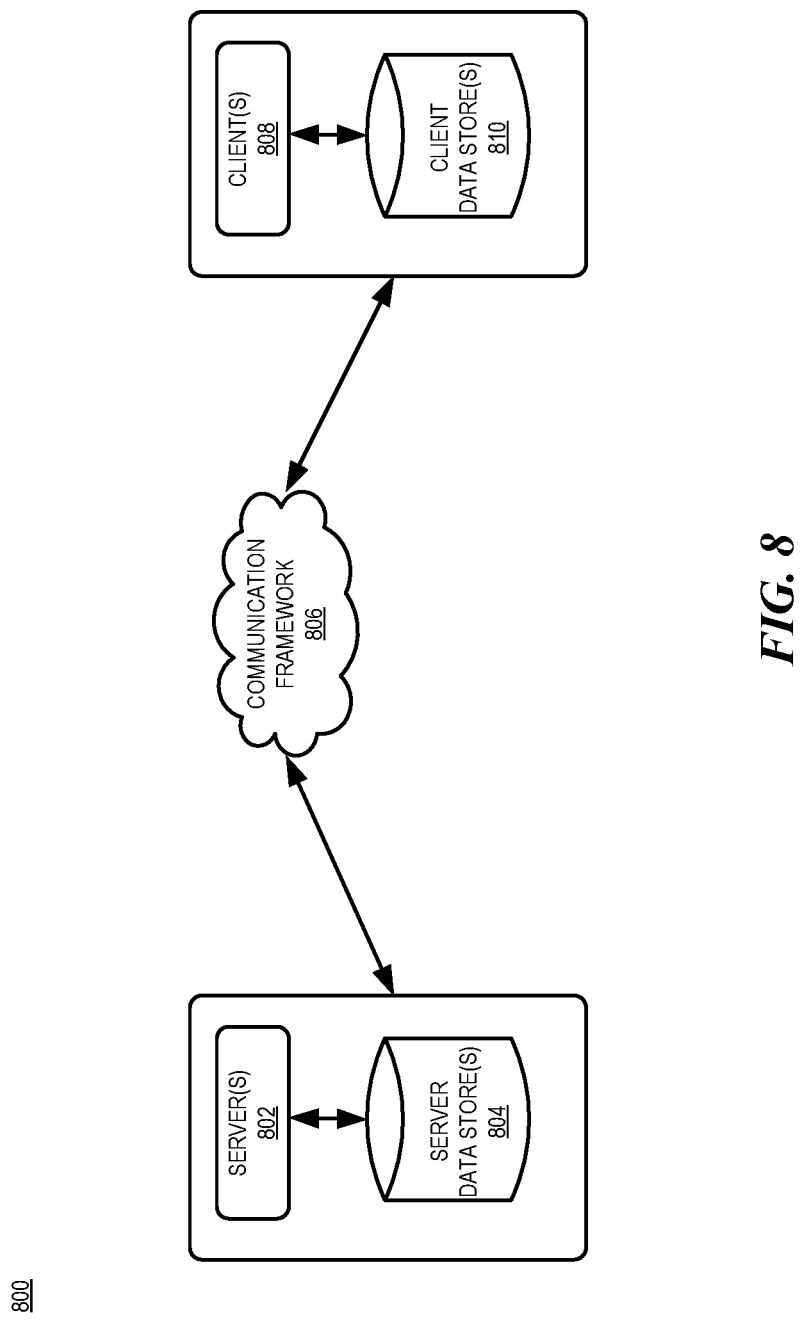
FIG. 8 is a block diagram illustrating an exemplary operating environment.

Attention now turns to a discussion of an exemplary operating environment. Referring now to FIG. 8, there is shown a schematic block diagram of an exemplary operating environment 800. The embodiments may be applied to an operating environment 800 having one or more servers 802 communicatively coupled through a communication network 806 to one or more clients 808. It should be noted that the operating environment 800 is exemplary and is not intended to suggest any limitation as to the functionality of the embodiments. In one or more embodiments, a server may be a distribution server and a client may be a customer and a server may be the transport server and the clients may be the distribution servers.

Each server 802 may be communicatively coupled to one or more server data stores 804. A server 802 may be embodied as a hardware device, a software module, or a combination thereof. The server 802 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The server 802 may also be embodied as a software module having instructions that execute in a single execution path, multiple concurrent execution paths (e.g., thread, process, etc.), or in any other manner.

Each client 808 may be embodied as a hardware device, a software module, or a combination thereof. A client 808 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. A client 808 may also be embodied as a software module having instructions that execute in a single execution path, multiple concurrent execution paths (e.g., thread, process, etc.), or in any other manner.

The communication framework 806 facilitates communications between the servers and the clients. The communication framework 806 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

Each server 802 and client 808 may include various types of standard communication elements designed to be interoperable with the communication framework 806, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Figure 9:
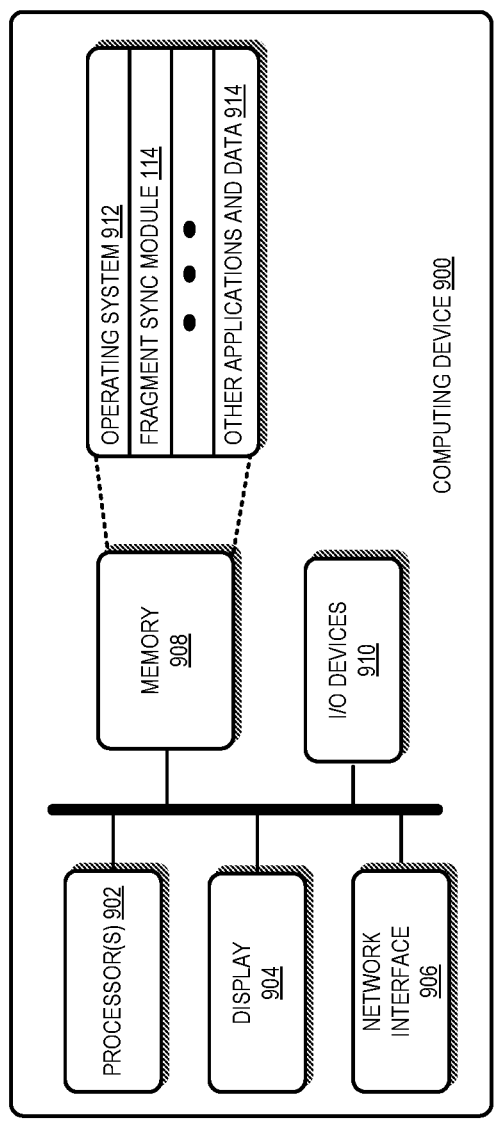
FIG. 9 is a block diagram illustrating an exemplary computing device used in the operating environment.

FIG. 9 illustrates an exemplary computing device that may be used as a distribution server. The computing device 900 may have one or more processors 902, a display 904, a network interface 906, a memory 908, and one or more input/output (I/O) devices 910. A processor 902 may be any commercially available processor and may include dual microprocessors and multi-processor architectures. The display 904 may be any visual display unit and it may be embedded within a computing device or physically separated from it. The network interface 906 facilitates wired or wireless communications between the computing device 900 and a communication framework. The I/O devices 910 may include a keyboard, mouse, pointing device, microphone, other devices to receive voice input, touch screen, devices to accept gesture input, and the like.

The memory 908 may be any type of computer-readable storage media or computer-readable storage device that stores executable procedures, applications, and data. The memory 908 may be implemented as a memory device (e.g., random access memory, read-only memory, etc.), magnetic storage, volatile storage, non-volatile storage, optical storage, DVD, CD, floppy disk drive, flash drive, and so forth and any combination thereof. The computer-readable storage media does not pertain to propagated signals, such as modulated data signals transmitted through a carrier wave. The memory 908 may also include one or more external storage devices or remotely located storage devices. The memory 908 may contain instructions and data as follows:

an operating system 912;
a fragment sync module 114; and
various other applications and data 914.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, the method comprising:

receiving a first packet of a first video stream, the first packet carrying a first frame of the first video stream, the first frame having associated therewith a first timestamp encoded using a first number of bits;

receiving a second packet of the first video stream, the second packet carrying a second frame of the first video stream, and the second frame having associated therewith a second timestamp encoded using the first number of bits; and determining a first mapping between the first timestamp and a third timestamp, wherein the third timestamp is encoded using a second number of bits different than the first number of bits, determining a second mapping between the second timestamp and a fourth timestamp, wherein the fourth timestamp is encoded using the second number of bits;

employing the determined first mapping and the determined second mapping for converting the first video stream into a second video stream.

2. The computer-implemented method of claim 1, further comprising:

distributing at least one of the first mapping or the second mapping to a distribution server.

3. The computer-implemented method of claim 2, further comprising:

determining the third and the fourth timestamps according to at least one of the determined first mapping or the determined second mapping.

4. The computer-implemented method of claim 1, further comprising:

receiving an indication of an election of a server as a leader for synchronization of timestamp mappings.

5. The computer-implemented method of claim 1, further comprising:

re-electing a leader in response to not receiving, within a timeout interval a proposal for a timestamp mapping.

6. The computer-implemented method of claim 1, further comprising:

re-electing a leader in response to not receiving an acknowledgement from a distribution server.

7. The computer-implemented method of claim 1, wherein determining the first mapping comprises:
receiving a proposal for the first mapping from a server.

8. The computer-implemented method of claim 1, wherein the first video stream is in an MPEG2 TS format.

9. The computer-implemented method of claim 1, further comprising:
streaming the second video stream through an adaptive HTTP streaming protocol.

10. The computer-implemented method of claim 1, further comprising:
streaming the second video stream through a Smooth-Streaming protocol.

11. A computing device, comprising:
a memory and a processor, wherein the memory and the processor respectively that store and execute instructions, including instructions for causing the computing device to perform operations, the operations comprising:
receiving a first video stream that is encoded in a first format that defines a first timestamp as being encoded into a first quantity of bits;
determine a timestamp reference, for the first video stream, that is coordinated with another computing device;
produce a mapping, between the first timestamp defined by the first format and a second timestamp defined by a second format of a second video stream, in accordance with the timestamp reference, the second timestamp defined by the second format as being encoded into a different quantity of bits than the first quantity of bits; and
converting the first video stream into the second format according to the determined mapping.

12. The device of claim 11, wherein the operations further comprise:
generating the timestamp reference for the first video stream from a current universal time coordinated (UTC) time.

13. The device of claim 11, wherein the operations further comprise:
generating another timestamp for the first video stream based on a duration of a transmission of a packet from the first video stream.

14. The device of claim 11, wherein the operations further comprise:
randomly electing a leader from amongst a plurality of distribution servers.

15. The device of claim 14, wherein the operations further comprise:
re-electing the leader in response to an indication that an acknowledgement message was not received by at least one of the plurality of distribution servers.

16. A computing device, comprising:
a processor and a memory, the memory having instructions stored therein for causing the computing device to:
receive a first video stream encoded in a first transport protocol, the first video stream including a first frame and a second frame, the first frame having associated therewith a first timestamp encoded into a first number of bits, and the second frame having associated therewith a second timestamp encoded into the first number of bits;
select a server from a multicast group to coordinate synchronization of the first timestamp with a third timestamp encoded into a second number of bits, the second number of bits being different than the first number of bits, and to coordinate synchronization of the second timestamp with a fourth timestamp encoded into the second number of bits;
generate a first mapping between the first timestamp and the third timestamp;
generate a second mapping between the second timestamp and the fourth timestamp; and
converting the first video stream into the second format according to the determined first mapping and the determined second mapping.

17. The computing device of claim 16, wherein:
the first timestamp is discontinuous with the second timestamp; and
the third timestamp is continuous with the fourth timestamp.

18. The computing device of claim 17, wherein the instructions are also for causing the computing device to:
generate the second mapping based on a duration of time between the first frame and the second frame.

19. The computing device of claim 17, wherein the instructions are also for causing the computing device to:
generate the second mapping based on a number of cycles, in a time scale associated with the first timestamp, between a time associated with the first timestamp and a current time.

20. The computing device of claim 16, wherein the first transport protocol is MPEG2 TS and the second transport protocol is Smooth Streaming.

* * * * *